United States Patent Office 3,804,840
Patented Apr. 16, 1974

---

3,804,840
MANUFACTURE OF HALOGENATED PYRIDINE DERIVATIVES
Roy Dennis Bowden and Thomas Seaton, Runcorn, England, assignors to Imperial Chemical Industries Limited, London, England
No Drawing. Filed May 1, 1972, Ser. No. 248,810
Claims priority, application Great Britain, May 4, 1971, 12,903/71,
Int. Cl. C07d *31/26*
U.S. Cl. 260—290 HL                    9 Claims

ABSTRACT OF THE DISCLOSURE

A process for the manufacture of a chloropyridine (especially pentachloropyridine) which comprises interacting glutaronitrile with chlorine in the vapor phase at an elevated temperature.

---

This invention relates to halogenated pyridine derivatives, and more particularly to chloropyridines and to a process for their preparation.

Previously known methods of producing chloropyridines have relied upon the chlorination of a preformed pyridine ring. Chloropyridines and a wide range of compounds derived therefrom are known to have a variety of applications (for example in the preparation of herbicidal compositions) but the availability of these compounds has been somewhat restricted.

We have now found that chloropyridines may conveniently be produced by a process which does not require the use of pyridine itself as starting material; surprisingly we have found that chloropyridines may be prepared directly by chlorination of glutaronitrile.

Thus according to the present invention there is provided a process for the manufacture of a chloropyridine which comprises interacting glutaronitrile with chlorine in the vapor phase at an elevated temperature.

The chlorination reaction is preferably carried out at a temperature of at least 250° C. preferably in the range from 400° C. to 600° C. and especially in the range from 500° C. to 600° C.

It is preferred to preheat separately the feed of chlorine and the feed of glutaronitrile.

The reactants may be diluted with inorganic diluents, for example nitrogen and/or steam, or with organic diluents, preferably inert towards chlorine, for example carbon tetrachloride or chloroform. When a gaseous or volatile diluent is used the glutaronitrile may be vaporized in the stream of diluent vapor which serves as a carrier gas; when a liquid diluent is used, the glutaronitrile may be dissolved in the liquid diluent and the resulting solution may then be vaporized as a whole.

The process is especially applicable to the production of pentachloropyridine but chloropyridines containing fewer than five chlorine atoms may also be obtained, the proportion of such products depending upon the proportion of chlorine employed, the reaction temperature and the residence time.

In general it is preferred to use at least five moles of chlorine per mole of glutaronitrile. When pentachloropyridine is desired as the main product it is especially preferred to use at least ten moles (for example from fifteen to thirty moles) of chlorine per mole of glutaronitrile. In general the upper limit to the proportion of chlorine will be governed by economic considerations.

The reaction may be carried out in the absence of a catalyst, but a catalyst may be present if desired, for example a porous material comprising silica, alumina (or a mixture or combination of silica and alumina) or carbon.

Convenient residence times of the mixture in the reaction zone are, for example, between ten and thirty seconds, but higher or lower residence times may be used if desired.

Glutaronitrile may conveniently be prepared, for example, by dehydration of glutaramide.

The desired chloropyridine(s) may be isolated from the reaction products by conventional techniques, for example by fractional distillation, fractional crystallization, solvent extraction or a combination of such techniques.

The invention is illustrated but not limited by the following example:

EXAMPLE

A solution of glutaronitrile (9.4 g.) in chloroform (72 g.) was fed at a rate of 0.6 ml./min. to a packed vaporizer maintained at 350° C. The issuing vapors were passed to a vertical glass tubular reactor of one inch bore held at a temperature of 550° C.±10° C. where they were mixed with chlorine fed at a rate of 0.46 litre/min. measured at 20° C. The gaseous feed to the reactor contained six moles of chloroform and twenty moles of chlorine per mole of glutaronitrile; the residence time was twenty seconds. The gaseous reactor effluent was condensed and collected in cooled carbon tetrachloride. The resulting carbon tetrachloride solution was distilled to remove solvent and the residual solid was collected and analyzed by gas-liquid chromatography. The product contained pentachloropyridine 5.7 g. (40% yield based on the glutaronitrile fed), together with 2,3,6- and 2,4,6-trichloropyridines and 2,3,5,6-tetrachloropyridines. Recrystallization from carbon tetrachloride gave substantially pure pentachloropyridine.

What we claim is:

1. A process for the manufacture of a chloropyridine which comprises reacting glutaronitrile with chlorine in the vapor phase at a temperature of 250° C. to 600° C.

2. A process as claimed in claim 1 wherein the proportion of chlorine is at least five moles of chlorine per mole of glutaronitrile.

3. A process as claimed in claim 2 wherein the proportion of chlorine is at least ten moles per mole of glutaronitrile.

4. A process as claimed in claim 3 wherein the proportion of chlorine is from fifteen to thirty moles per mole of glutaronitrile.

5. A process as claimed in claim 1 wherein the reaction temperature is in the range from 400° C. to 600° C.

6. A process as claimed in claim 5 wherein the reaction temperature is in the range from 500° C. to 600° C.

7. A process as claimed in claim 1 wherein the reaction is carried out in the presence of a diluent.

8. A process as claimed in claim 7 wherein the diluent is nitrogen and/or steam.

9. A process as claimed in claim 7 wherein the diluent is chloroform or carbon tetrachloride.

References Cited

UNITED STATES PATENTS

| | | | |
|---|---|---|---|
| 3,592,817 | 7/1971 | Johnston et al. | 260—290 |
| 3,532,701 | 10/1970 | Marinak | 260—290 |

OTHER REFERENCES

Klingeberg, Heterocyclic Compounds, Pyridine and Its Deriv., part II, pp. 337, 387 and 388 (1961).

HARRY I. MOATZ, Primary Examiner